Dec. 12, 1967 H. EBERLE 3,357,808
METHOD OF PREPARING FIBERS FROM A VISCOUS MELT
Filed Dec. 29, 1964 2 Sheets-Sheet 1

INVENTOR
HANS EBERLE
By
AGENT

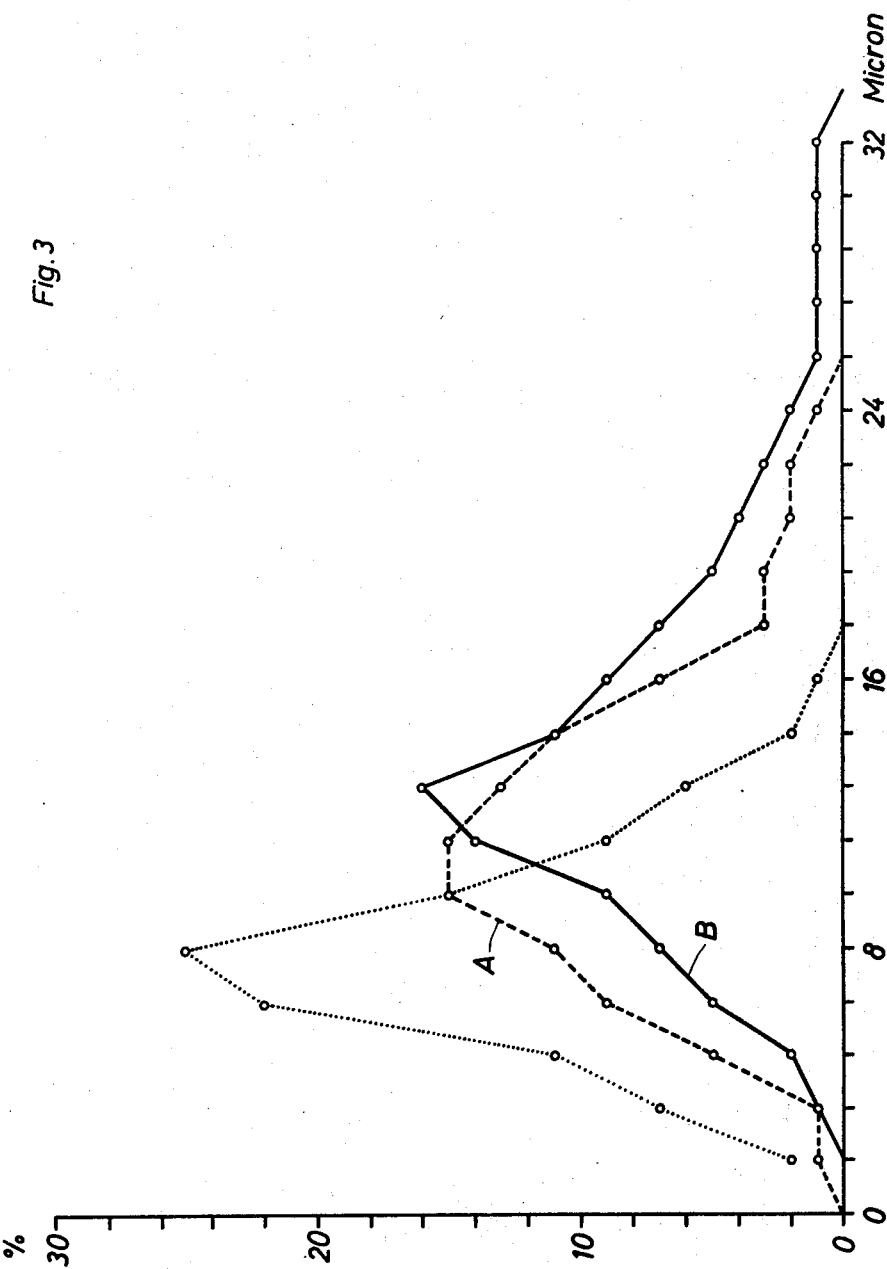

United States Patent Office 3,357,808
Patented Dec. 12, 1967

3,357,808
METHOD OF PREPARING FIBERS FROM A VISCOUS MELT
Hans Eberle, Ludwigshafen (Rhine), Germany, assignor to Grunzweig & Hartmann AG, Ludwigshafen (Rhine), Germany
Filed Dec. 29, 1964, Ser. No. 426,464
Claims priority, application Germany, Oct. 24, 1960, G 30,771; Nov. 2, 1960, G 30,841; Nov. 11, 1960, G 30,848; Aug. 14, 1961, G 32,928
3 Claims. (Cl. 65—7)

ABSTRACT OF THE DISCLOSURE

The cross section of glass fibers prepared by dispersing filaments of molten glass in a stream of cooler air is improved by directing a second stream of air transversely against the fibers while they are still partly fluid.

---

This is a continuation-in-part of my application Ser. No. 145,668, filed Oct. 17, 1961, now abandoned.

This invention relates to a method of preparing fibers from viscous melts, and more particularly to an improvement in the known method in which a viscous fluid material is dispersed by a stream of gas into fibers which are solidified by cooling below the melting temperature of the material.

The known method and this invention will be described hereinafter with particular reference to the production of glass fibers from molten glass, but it will be understood that the invention is not limited to any specific material, but is applicable to all materials which fuse and solidify over a relatively wide range of temperatures and do not have the well-defined melting point characteristic of metals and similar crystalline materials.

It is known to extrude glass from a nozzle in a continuous filament, and to dissolve the filament into fibers of limited length by a stream of air or other gas which flows mainly in the direction of elongation of the filament at a velocity much greater than the rate of extrusion. The fibers produced by the conventional methods are smaller in cross section than the original filament, but the cross section of many fibers shows gross variations along the length thereof, and the average cross sections of the individual fibers vary over a relatively wide range.

The primary object of the invention is a method of preparing fibers from glass and other material showing glass-like melting behavior which are relatively uniform in cross section from one end of each fiber to the other, and which show relatively little variation in overall cross section from one fiber to the other.

Other objects and many of the attendant advantages of this invention will become apparent as the disclosure proceeds.

We have found that the uniformity of a fibrous product obtained by subjecting a continuous filament of a viscous melt to the action of a streaming gas can be greatly enhanced if the fibers primarily formed from the filament by a first rapid stream of gas are deflected from their original direction of movement by a second stream of gas transverse to the first stream while they are still fluid enough to undergo plastic deformation under the impact of the second gas stream.

In one of its basic aspects, this invention mainly resides in a method in which a discharged filament of viscous material is contacted with a first gas stream which flows at a velocity greater than the rate of material discharge, the velocity being sufficient to disperse the filament into elongated fibers which are entrained by the gas and whose temperature is being reduced below the temperature of the discharged material by the gas stream. The entrained fibers, while partly still in the fluid state, are contacted with a second gas stream flowing transversely of the first stream at a velocity sufficient to deflect the fibers and to plastically deform their fluid portions. The fibers then are fully solidified by cooling.

The temperature at which filaments or fibers may be plastically deformed by a stream of air moving faster than the filaments or fibers is an inherent property of the material of which the filaments or fibers consist. Under the conditions of gas velocity which can be readily attained by practical devices in the method of the invention, the upper limit of fiber or filament viscosity at which deformation can be achieved is approximately $10^7$ poises. It is therefore necessary that the viscosity of at least those portions of the primary fibers which are to be further attenuated by the second gas stream be lower than $10^7$ poises, and a filament-forming viscous material having a viscosity not greater than $10^7$ poises will hereinafter be referred to as being fluid.

When the original filament is dispersed by a stream of a colder gas or when the fibers formed are otherwise cooled, the temperature of the thinner fiber portions drops more rapidly than that of thicker fiber portions, and thinner fibers are cooled faster than thicker ones under otherwise similar conditions because of the more favorable surface-to-weight ratio in the thinner bodies. We have found that the resulting differences in viscosity between thick and thin fiber portions, and between thick and thin fibers are sufficient to permit selective attenuation of these thicker fiber portions and thicker fibers by the second stream of gas, particularly if the temperature of the latter is near or below the temperature of the treated fibers at the moment of contact.

Dispersion of a filament into fibers by the first gas stream and further attenuation of the fibers or fiber portions by the second gas stream require velocity differences between the gas and the entrained liquid or semi-solid material. The point of contact between the second gas stream and the primary fibers is preferably selected in our method where the difference of the velocities of the primary fibers and the first gas stream has been reduced to an ineffective value.

Other features of the invention will be readily appreciated as the same becomes better understood from the following detailed description of preferred apparatus for performing the method of the invention, when considered with the annexed drawing in which:

FIG. 3 is a graph of frequency distribution curves, with fiber diameters being indicated on the abscissa and frequency in percent on the ordinate.

Figure 1:
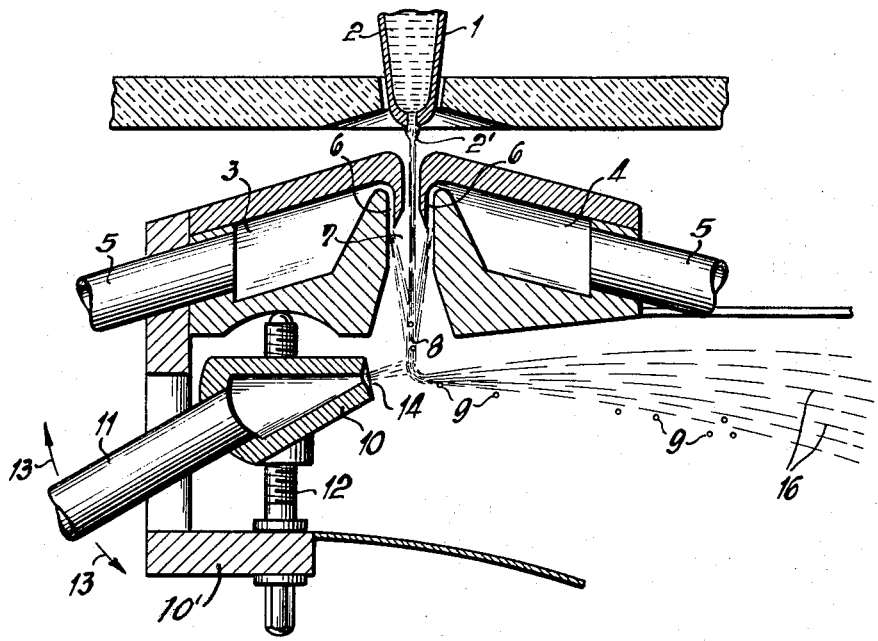
FIG. 1 shows a nozzle arrangement for producing glass fibers by the method of the invention, the view being in elevational section.

Referring now to the drawing in detail, and initially to FIG. 1, there is shown a nozzle 1 connected to a melting furnace in a conventional manner, not further illustrated. Liquid glass 2 is discharged by gravity from the circular opening of the nozzle 1 to form a downwardly directed stream 2' of approximately cylindrical filaments.

Two primary air nozzles 3, 4 at opposite sides of the stream 2' under the nozzle 1 are connected to a compressed air line by pipes 5. Their discharge openings 6 are directed downward for interaction with the glass stream 2' in the channel 7 between the nozzles 3, 4. The velocity of the air jets is much greater than that of the flowing glass, and the glass filaments are broken up into particles 8 which are generally elongated in the direction of air flow.

If the fibrous material discharged from the channel 7 is permitted to solidify, it is found to be of variable thickness, the variation being found both from fiber to fiber, and from one longitudinal fiber portion to another portion of the same fiber. Beads appearing to be strung on fibers, and glass beads 9 not associated with fibers are found in the solidified material.

Within two inches from the nozzles 3, 4, there is provided a secondary air nozzle 10. The nozzle is connected to the afore-mentioned compressed air line by a pipe 11, and it will be understood that the connection includes non-illustrated control valves as is conventional. The nozzle 10 is mounted on a common support with the nozzle 3 by means of a rotatable threaded pin 12 which has a vertical axis and engages internal threads in a bore of a nozzle mount 10'. Rotation of the pin 12 thus results in adjustment of the nozzle 10 longitudinally of the stream of glass from the nozzle 1, while the nozzle mount 10' is prevented from rotation by abutting engagement with the supporting structure. The nozzle 10 is pivotally mounted on the mount 10' as indicated by the arrows 13. The jet of air discharged from the orifice 14 of the nozzle 10 may thus be aimed precisely at the stream of glass particles 8 where the fluidity of the latter is best suited for the desired effect.

The secondary air jet from the nozzle 10 is inclined upward from a horizontal direction at a very small acute angle, and thus approximately perpendicular to the direction of primary movement of the viscous, but still fluid glass fibers and beads. The direction of movement of the glass particles is changed abruptly by the secondary jet and their velocity is increased. When the material of the diverted stream is permitted to solidify and is collected, it is found to contain fibers 16 thinner and much more uniform than those in the material discharged directly from the channel 7. There may still be a few residual beads 9, but their number has been greatly reduced.

Because the beads 9 are more compact, they tend to settle more rapidly than the fibers 16 from the secondary air stream. The apparatus illustrated in FIG. 2 makes use of this fact for separating the beads from the fibers. The afore-described nozzles 1, 3, 4, and 10 are mounted at one end of a horizontally elongated cooling chamber 15. The glass particles are blown longitudinally through the chamber by the air jet discharged from the nozzle 10. A horizontally arranged endless belt conveyor 17 moves from the end of the chamber 15 remote from the nozzles outward through an opening in the chamber wall. The fibers 16 are carried by the air jet to the conveyor 17. They solidify before they are deposited on the conveyor for discharge and collection outside the chamber 15.

Another belt conveyor 18 arranged in the cooling chamber 15 between the nozzles and the conveyor 17 receives the beads 9 and deposits them in the chamber for remelting of such other processing as may be desired.

A spray nozzle 19 is arranged in the top of the chamber 15 for coating the sufficiently solidified fibers with a liquid binder, a lubricant, or such other conventional addition agents as may be desired. When the fibers are coated with a binder, a mat of at least partly bonded fibers may be taken directly from the conveyor 17.

Figure 2:
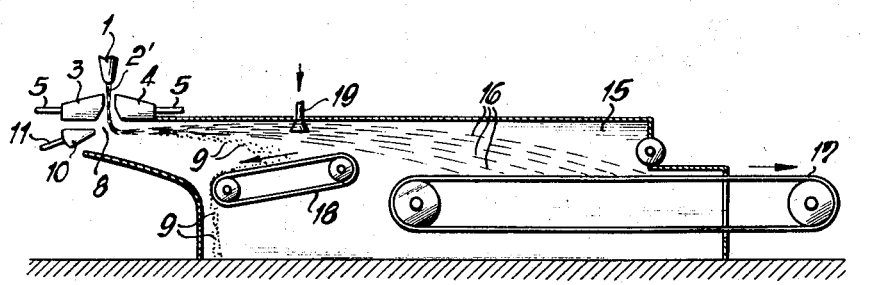
FIG. 2 illustrates an apparatus for transforming a viscous glass melt into solid fibers of relatively uniform cross section, the apparatus including the nozzle arrangement of FIG. 1 and being shown in elevational section.

The following examples are illustrative of the operation of an apparatus of the type shown in FIGS. 1 and 2, and it will be understood that the invention is not limited thereto.

*Example I*

Fibers were prepared from a glass melt having the following composition by weight:

| | Percent |
|---|---|
| $SiO_2$ | 53.3 |
| $Al_2O_3$ | 7.8 |
| CaO | 31.0 |
| MgO | 2.2 |
| $Na_2O$ | 2.9 |
| $Fe_2O_3$ and others | 2.8 |
| Surface tension at 900° C. dynes per cm | 400 |

The melt, which had an original temperature of 1450° C. was extruded through a nozzle having eight circular apertures of 1.8 millimeter diameter under a static head of approximately 7 cm. of molten glass. The discharge rate was 30 to 40 grams glass per minute and nozzle aperture.

Air was discharged against the eight filaments of extruded glass at 60 p.s.i.g. and 20° C. (ambient temperature) from nozzles having a width of 0.3 millimeter, whereby the filaments were dispersed into a multiplicity of elongated fibers. At a distance of slightly less than 2 inches from the extrusion nozzle, the fiber stream was deflected by another air stream substantially at right angles to the first stream. The second air stream had an initial pressure of 60 p.s.i.g. and a temperature of 20° C., and was released from a nozzle one millimeter wide.

The solidified fibers were collected and their maximum diameters were measured. The results of these measurements are indicated by the distribution curve A in FIG. 3. As is seen from the curve, the arithmetic means of fiber diameter is 11.6 microns, and the standard deviation is 4.4 microns.

*Example II*

The procedure of Example I was repeated under otherwise identical conditions with an air pressure of 60 p.s.i.g. applied to the primary air nozzles, and without application of secondary air. The results are illustrated in curve B of FIG. 3 and show a fiber diameter distribution having an arithmetic mean of 14.2 microns and a standard deviation of 5.6 microns.

*Example III*

In yet another run under conditions otherwise similar to those of Example I, the air fed to the secondary nozzles was preheated to about 350° C. so that it had a temperature of approximately 150° C. after expansion in the nozzle when it contacted the glass fibers.

The slower cooling of the glass fibers due to the higher temperature of the second air stream further reduced the mean diameter of the fibers produced to 7.9 microns, and reduced the standard deviation of the fiber thickness distribution to 2.9 microns.

The temperature of the primary air stream is not overly critical, but it should not be substantially higher than the melting range of the glass and should be lower than the actual glass temperature. The secondary air stream should not have a temperature substantially above the temperature of the primary glass fibers at the moment of contact, but it is advantageous to make the temperature of the secondary air stream higher than ambient temperature to retard solidification of the glass. The effect achieved thereby is evident from comparison of curves A and C in FIG. 3.

The optimum distances between the glass extrusion nozzle 1, the primary air nozzles 3, 4, and the secondary air nozzle 10 along the path of the primary fibers 8 depend on the temperature of the glass melt, on the relationship of temperature and viscosity in the glass melt, on the condition prevailing at the interface between the extruded glass filaments and the primary air stream, on the velocity and temperature of the latter, and on numerous similar factors too complex to permit complete analysis. The best position of the nozzle can readily be determined by trial in the apparatus of FIG. 1 because of the movable mounting of the nozzle 10.

When the method of the invention is to be carried out under stable conditions, I prefer to employ air nozzles whose relative position is fixed on the basis of preliminary tests, and to maintain all other process variables within limits that ensure optimum performance from the fixed air nozzles.

It should be understood, of course, that the foregoing disclosure relates to only a preferred embodiment of the invention, and that it is intended to cover all changes and modifications of the examples of the invention herein chosen for the purpose of the disclosure which do not constitute departures from the spirit and scope of the invention set forth in the appended claims.

What I claim is:

1. A method of producing fibers from a filament-forming viscous melt which comprises:
   (a) discharging said melt in the fluid state from nozzle means in a continuous filament;
   (b) contacting said filament with a first stream of gas flowing at a velocity greater than the rate of discharge of said material, the velocity of said stream being sufficient to disperse said filament into a plurality of elongated fibers and to move said fibers in the direction of elongation thereof;
   (c) reducing the temperature of said fibers by contact with said stream below the temperature of the discharged material while maintaining a portion of said fibers in said fluid state; and
   (d) contacting said partly fluid fibers with a second stream of a gas flowing transversely of said direction, the velocity of said second stream being sufficient to deflect said fibers transversely and to plastically deform said portion of said fibers.

2. A method as set forth in claim 1, wherein the temperature of said second stream is higher than the temperature of said first stream, but lower than the temperature of the fibers at the time of contact with said second stream whereby the temperature of said fibers is further reduced by contact with said second stream.

3. A method as set forth in claim 1, wherein the temperature of said second stream at contact with said fibers is higher than ambient temperature, but not substantially higher than the temperature of the contacted fibers.

References Cited

UNITED STATES PATENTS

| | | | |
|---|---|---|---|
| 1,807,178 | 5/1931 | Seil | 65—5 XR |
| 2,450,363 | 9/1948 | Slayter et al. | 65—13 |

DONALL H. SYLVESTER, *Primary Examiner.*

R. L. LINDSAY, *Assistant Examiner.*